3,112,312
MELAMINE SYNTHESIS
Preston L. Veltman, Severna Park, Md., and Elton Fisher, Memphis, Tenn., assignors to W. R. Grace & Co., a corporation of Connecticut
No Drawing. Filed Nov. 14, 1960, Ser. No. 68,610
4 Claims. (Cl. 260—249.7)

This invention is directed to making melamine by passing a mixture of ammonia and cyanic acid vapors through a bed of quartz particles coated with phosphoric acid, at a temperature of 300–425° C. and at a pressure ranging from sub-atmospheric (e.g., 0.5 atmosphere) to superatmospheric pressures of the order of about 5 atmospheres.

The following examples illustrate without limiting the invention.

EXAMPLE 1

*Preparation of Catalyst*

Quartz was crushed and screened so as to provide 500 g. of particles passing through a No. 10 sieve (U.S. Bureau of Standards) but all remaining on a No. 30 sieve. This material was treated with 35 grams of 85% syrupy phosphoric acid by mixing the quartz with the phosphoric acid followed by drying in an oven overnight at 110° C. The material so prepared was then stirred so as to free the individual pieces from each other, and it was then placed in the catalyst bed section of apparatus described in the following Example 2.

EXAMPLE 2

*Apparatus*

This apparatus was designed to use cyanuric acid as the source of cyanic acid feed. This was a 42 inch section of 2" carbon steel pipe. One end was threaded and equipped with a screw cap fitted with a quick opening gate valve. The unit was operated in a vertical position so that the capped end became the top of the reactor. An ammonia inlet port was also provided on the side of the pipe adjacent the cap. About 14 inches from the bottom of the reactor a retaining ring and perforated plate was placed on the inside of the pipe to support the catalyst bed, which bed was about six inches deep. A second retaining ring supporting steel chips (which served as a cyanuric acid vaporizer) was placed inside the pipe about 15" from the top. The exterior of the pipe was wrapped with two sections of electrical resistance wire. One heating element extended from about 3" from the top of the reactor to about 1½" below the retaining ring that supported the steel chips used to vaporize cyanuric acid. This element supplied heat to the vaporizer. The second heating element extended from about 1½" from the bottom of the first element to within about 12" of the bottom of the reactor. This element supplied heat to the catalyst bed. The lower (unheated) portion of the reactor stayed at a temperature (about 95° C.) low enough to permit the deposition of solid melamine from the vapor effluent, at substantially atmospheric pressure, without depositing by-product ammonium carbamate.

During operations the top part of the tube (above the catalyst bed section) is kept at any temperature hot enough to decompose cyanuric acid to cyanic acid, i.e., 200–600° C., or, typically, 350–500° C. The catalyst section is maintained at 300°–425° C., or, typically, 350–400° C. Cyanuric acid is fed to the top in periodic portions, e.g., by dropping in 4-gram portions every thirty minutes. (The gate valve is opened and closed quickly to avoid loss of material.) Ammonia sweep is fed to the ammonia inlet port at a rate in molar excess over the cyanuric acid feed, e.g., 56 g./hour when the cyanuric acid rate is 8 g./hour.

EXAMPLE 3

*Melamine Synthesis*

Using the catalyst of Example 1 and the apparatus of Example 2, a melamine run was made. The phosphoric acid treated quartz weighed 483 grams and had a bulk volume of 308 ml. Three runs of 16 hours each were made. The cyanuric acid decomposer section was maintained at 380–385° C. Crude cyanuric acid feed was at the rate of 8 grams per hour (4 g. every 30 mins.) and ammonia feed was at the rate of 56 grams per hour. These feed rates provided a pressure of about 1.3 atmospheres absolute as delivered to the catalyst bed. In the first 16 hour run the yield of melamine was 51% of theory; in the second 16 hour run the yield was 52%; and in the third 16 hour run, the yield was 71% of theory. This gave a cumulative conversion for the 48 hour operation of 58%.

Two control runs were made under identical conditions except that in the first control run the catalyst bed was empty. This run gave 13% conversion for three 16 hour runs. In the second control run the catalyst was quartz chips (all through 10 mesh and all on 30 mesh) untreated with $H_3PO_4$. This catalyst gave a conversion of 15% for three 16 hour runs.

EXAMPLE 4

In three runs identical under the same conditions of Example 3, but in which the crushed quartz carried 12% by weight phosphoric acid, the melamine yields were respectively 48, 60 and 63%.

As has already been mentioned, the process is operable at a wide variety at temperatures and pressures. Some melamine is made at temperatures as low as 300° C. and the yields become excellent at temperatures of the order of 400° C., dropping slowly until 425° C., at which temperature side products are formed in undesirable amounts.

As has likewise been mentioned, the pressure is not critical. Apparently, it has little bearing on the mechanism of the reaction, and in its preferred embodiment the invention is carried out as close to atmospheric pressure conditions as practicable. For example, the exit vapors from the catalyst bed are preferably vented at atmospheric pressure to the melamine collection system, and on the feed side of the catalyst bed the pressure is preferably about that which is sufficient to force the feed vapors through the catalyst bed. This is generally of the order of 2 to 6 atmospheres depending on the depth of the bed.

The ratio of ammonia to cyanic acid is likewise not critical. However, for best results, a molar excess of ammonia is used. Good results are generally obtained when using a feed stream consisting of $NH_3$:HNCO in a mole ratio of 2–10:1.

The amount of $H_3PO_4$ put on the quartz chips may be varied considerably. Good results are obtainable with amounts of $H_3PO_4$ within the range 2–20%, for example.

Prior to this invention it was apparently believed by those skilled in the art that the conversion of cyanic acid to melamine at low pressures (of the order of atmospheric pressure) required a catalyst of high porosity, e.g., at least 180 square meters per gram (Mackay, U.S. Patent 2,760,961). It was also known that sand (which is quartz, $SiO_2$) when heated with urea at atmospheric pressure, gave no melamine (U.S. Patent 2,760,961). The quartz particles of this invention have substantially no porosity, and a simple arithmetic calculation will show that the gross surface area of quartz particles of 10–30 mesh is well under 1 square meter/gram. Under these circumstances, it is believed surprising that the combination of quartz particles and phosphoric acid would give melamine from cyanic acid in such excellent yield.

We are aware that phosphoric acid has been proposed as a catalyst in the urea-to-melamine high pressure synthesis (Vingee, U.S. Patent 2,550,659). However, unlike the herein described use of $H_3PO_4$ on quartz, that use of phosphoric acid was simply to catalyze the formation of melamine in a synthesis that was already known to give melamine.

In operating this invention, small amounts of urea generally show up in the products, presumably by recombination of ammonia and cyanic acid present in the gases leaving the catalyst. Cyanuric acid, ammelide, melam, etc. may also appear. If desired, the crude melamine product can be purified by any conventional means, e.g., by crystallization from boiling water, treatment with dilute sodium hydroxide solution, and the like.

Where "crude cyanuric acid" is used as feed in these examples, the term refers to cyanuric acid containing minor amounts of ammelide, biuret, and urea. Whereas 100 g. pure cyanuric acid will give (theoretically) 48.8 g. melamine, 100 g. of the crude cyanuric acid used herein will give theoretically about 54 g. melamine, mainly on account of its ammelide content, and the latter standard is used in calculating yields wherever the feed is crude cyanuric acid. Cyanic acid from pure or crude cyanuric acid can be used in carrying out this invention, or it can be obtained by the vaporization of urea, or from other known sources.

The size of the quartz particles is not critical. Preferably, however, they should be large enough to permit reasonable rates of flow of the vapor reactants through the bed. For this reason, sizes in the range of 5–100 mesh are preferred. Also, the depth of the bed is not critical, bearing in mind the requirement that it should be deep enough to insure good vapor contact. For this purpose a depth of at least 3 inches is preferred, but even shallower beds can be used if the feed rate is reduced.

The chemical composition of the catalyst has not been established with certainty. It is known, of course, that on heating, phosphoric acid is dehydrated at least in part to condensed systems such as pyrophosphoric and metaphosphoric acids, and apparently these materials are formed initially to some extent on the quartz particles. There may be additional chemical changes in the catalyst during use.

We claim:

1. The method of preparing melamine comprising passing a vapor mixture of ammonia and cyanic acid through a catalyst bed of quartz particles coated with phosphoric acid at temperature of 300–425° C. and at a pressure of about 0.5 to 5 atmospheres absolute on the feed side of the catalyst bed, whereby the melamine is formed in the vapor phase, and is condensed and recovered.

2. The method according to claim 1 in which the temperature is about 390° C. and the pressure is about 1.3 atmospheres absolute on the feed side of the catalyst bed.

3. The method according to claim 1 in which the $NH_3$:HNCO mole ratio is 1 to 10:1.

4. The method according to claim 1 in which the catalyst is prepared by depositing 2–20% by weight of phosphoric acid on quartz chips within the mesh range of 10–30.

References Cited in the file of this patent

UNITED STATES PATENTS

| | | |
|---|---|---|
| 2,550,659 | Vingee | Apr. 24, 1951 |
| 2,615,019 | Klapproth | Oct. 21, 1952 |
| 2,712,491 | Boatright | July 5, 1955 |
| 2,760,961 | Mackay | Aug. 28, 1956 |

OTHER REFERENCES

Berkman: "Catalysis," Reinhold Pub. Co., New York, 1940, page 490.

Advances in Catalysis, volume VIII, Academic Press Inc., 1956, pages 236 and 237.